US006729597B2

(12) United States Patent
Cholinski et al.

(10) Patent No.: US 6,729,597 B2
(45) Date of Patent: May 4, 2004

(54) SUPPORT OF A DRIVE UNIT FOR A LIFT

(75) Inventors: Andrzej Cholinski, Ebikon (CH); Heinrich Küttel, Weggis (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/365,837

(22) Filed: Feb. 13, 2003

(65) Prior Publication Data

US 2003/0155480 A1 Aug. 21, 2003

(30) Foreign Application Priority Data

Feb. 18, 2002 (EP) .......................................... 02405123

(51) Int. Cl.[7] ................................................ F16M 1/00

(52) U.S. Cl. .................................................... 248/646

(58) Field of Search ............................ 248/188.4, 646, 248/676, 677, 678, 638, 562, 621

(56) References Cited

U.S. PATENT DOCUMENTS 3,730,463 A * 5/1973 Richard ...................... 248/580
3,758,058 A * 9/1973 Neudeck et al. .............. 410/46
4,281,739 A 8/1981 Keiser
4,519,467 A * 5/1985 Saunders ................... 180/68.4
4,846,436 A * 7/1989 Young et al. ............... 248/542
5,110,082 A 5/1992 Rowan, Jr.
5,308,036 A * 5/1994 Olson et al. ................ 248/638
5,344,116 A * 9/1994 Winkler ...................... 248/677
5,573,220 A * 11/1996 Whittaker et al. .......... 248/638
5,577,703 A * 11/1996 Young ........................ 248/550
5,771,990 A * 6/1998 Liang ......................... 181/208
5,820,092 A * 10/1998 Thaler ........................ 248/237
5,942,735 A * 8/1999 Liang ......................... 181/207
6,029,942 A * 2/2000 Daddis et al. .............. 248/635
6,138,979 A * 10/2000 Morman ..................... 248/638
6,186,453 B1 * 2/2001 Redbone .................. 248/188.4
6,442,906 B1 * 9/2002 Hwang ...................... 52/126.6

FOREIGN PATENT DOCUMENTS

DE 24 41 882 * 3/1976
WO WO 82/03109 A1 9/1982

OTHER PUBLICATIONS

Patent Abstracts of Japan, pub No. 04041385, Feb. 2, 1992, "Antiseismic Device Of Winch For Elevator", Mitsubishi Electric Corp.

* cited by examiner

*Primary Examiner*—Ramon O. Ramirez
*Assistant Examiner*—Kofi Schulterbrandt
(74) *Attorney, Agent, or Firm*—Schweitzer Cornman, Gross & Bondell LLP

(57) ABSTRACT

A lift drive unit support apparatus consists of multiple height-adjustable mounts, which conduct the forces of the drive unit to a foundation, fasten the drive unit in an earthquake-proof manner, and isolate it in terms of solid-borne sound from the foundation. The drive unit can be levelled in height by means of a tool, such as a shaft spanner, by way of an adjusting sleeve screwed into the engine frame. A foot plate inserted below the adjusting sleeve transmits vertical forces from the adjusting sleeve to a damping element. Horizontal forces are transmitted from the adjusting sleeve by way of a tube to a base plate and from there to an anchor bolt, which also prevents upward lift-off of the drive unit.

8 Claims, 4 Drawing Sheets

SUPPORT OF A DRIVE UNIT FOR A LIFT

The invention relates to a support for a drive unit for a lift, wherein several mounts transmit the forces caused by the drive unit to a foundation and acoustically isolate the drive unit from the foundation.

BACKGROUND OF THE INVENTION

A resilient mount for a frame of a lift engine is known from laid-open specification DE 24 41 882, which mount comprises a rubber body provided with horizontally-extending through-passages. The rubber body rests by a lower support surface on a carrier rail and the frame to be supported on the rubber body's upper support surface. The rubber body is connected with the frame by means of a bolt through a clamping connection. The through-passages, which ensure a large spring travel of the rubber body with sufficient horizontal stability, are provided in the lateral parts of the rubber body.

A disadvantage of the known equipment resides in the fact that the lift engine has to be raised up for height alignment and shims have to be placed below. Moreover, the lift engine is not mounted in an earthquake-proof manner by the mount.

BRIEF DESCRIPTIONS OF THE INVENTION

The present invention avoids the disadvantages of the known equipment and provides a mount for a drive unit of a lift, which facilitates on-site adjusting operations.

In accordance with the invention a plurality of mounts are positioned between the drive unit and the lift's foundation. Each of the mounts provides acoustic isolation, and may be height adjustable to level the drive unit. The mounts may include a damping element and may be constructed to transmit both vertical and horizontal forces to the foundation. Height adjustment may be provided by an adjusting sleeve which is threaded into a frame member of the drive unit. The sleeve sits on a foot plate which in turn rests on a damping element.

The advantages achieved by the invention include a standardisation of the mounts, whereby the piece number of the mount to be produced can be increased and thus production costs reduced. The mounts are economically assembled at the factory and a costly assembly at the building site is redundant. Factory assembly of the mounts, allowing them to be installed on the drive unit at the factory, additionally has the advantage that the sensitive shaft mounts of the drive unit are protected against harmful force effects occurring during transport of the drive unit to the building site. At the building site the drive unit can be height levelled in a simple manner. Forces caused by earthquakes can be transmitted to the mount foundation by the mount according to the invention.

BRIEF DESCRIPTION OF THE DRAWINGS

The present invention is explained in more detail on the basis of the following description of a preferred, but nonetheless illustrative embodiment, in connection with the accompanying figures, in which.

DETAILED DESCRIPTION OF THE INVENTION

Figure 1:
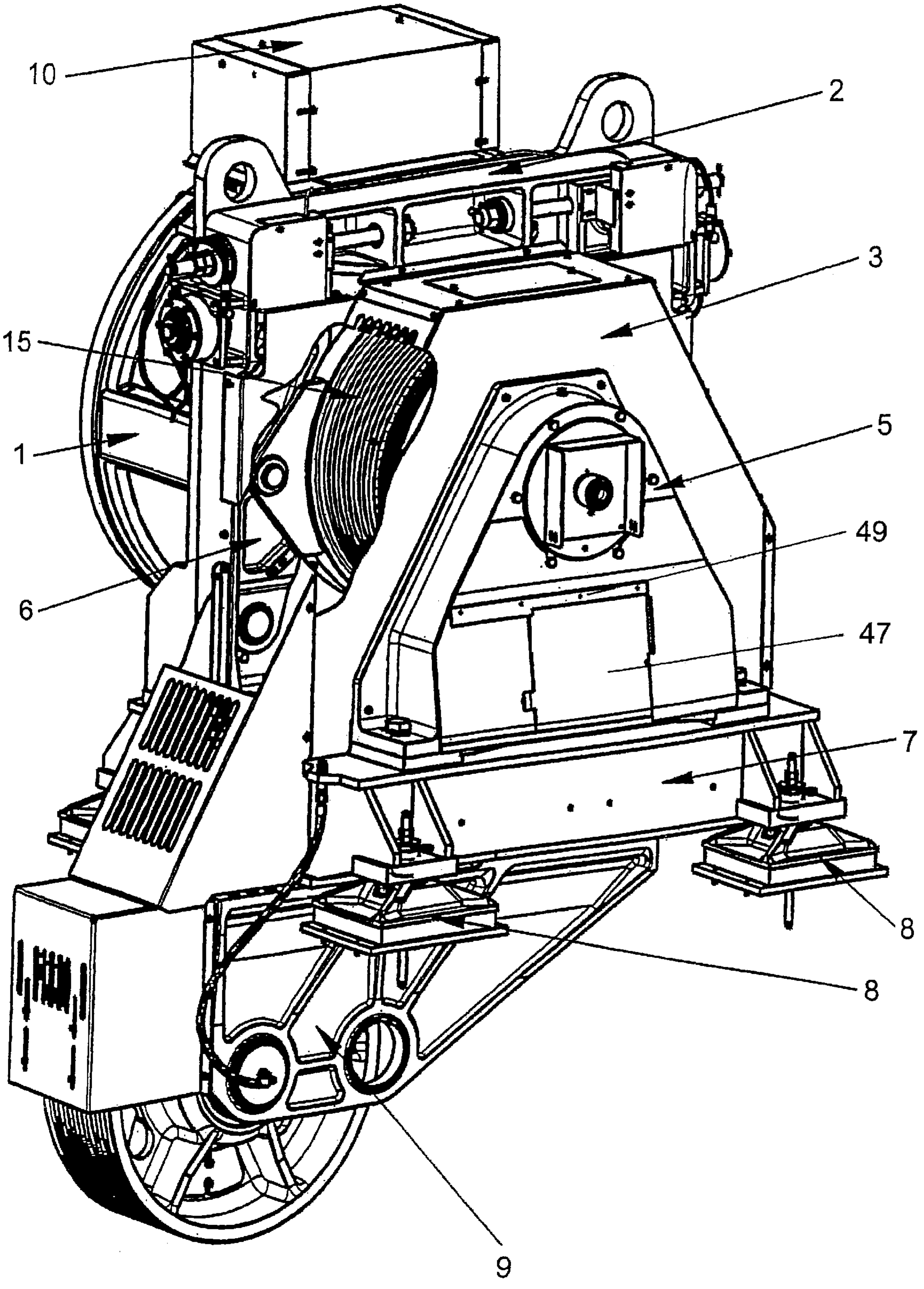
FIG. 1 is a perspective view of a support of a drive unit incorporating mounts of the invention.

FIG. 1 shows an assembled drive unit, comprising a motor 1, a motor stator 2 serving as an end plate, a bearing block 5 serving as a second end plate, a drive pulley 15 and an engine frame 7 with a counter roller support 9. Cables (not illustrated), which are connected at one end to a lift cage and are connected at another end to a counterweight, are guided over the drive pulley 15. The stator of the electric motor 1 is connected to by means of a flange with the motor stator 2. The rotor of the electric motor 1 is connected to a free end of a shaft which carries the drive pulley 15 and which is mounted to the bearing block 5 and the motor stator 2. The free shaft end projects beyond the motor stator 2. The drive pulley 4, which is visible through a broken-away section of cable protection casing 3, is mounted to the motor stator 2 and the bearing block 5 by means of the shaft. A brake 6 is arranged at the inside face of the motor stator 3 and is protected by the casing 3. Depending on the construction of the drive unit, the brake 6 can also be positioned at the inside face of bearing block 5.

The motor stator 2 and the bearing block 5 are arranged on the machine frame 7, which has a respective adjustable mount 8 at each of its corners. The counter roller support 9 is arranged at the underside of the engine frame 7. All electrical connections of the drive unit are in a terminal box 10. The drive pulley 15 is accessible from the outside after opening a slide cover 47.

Figure 2:
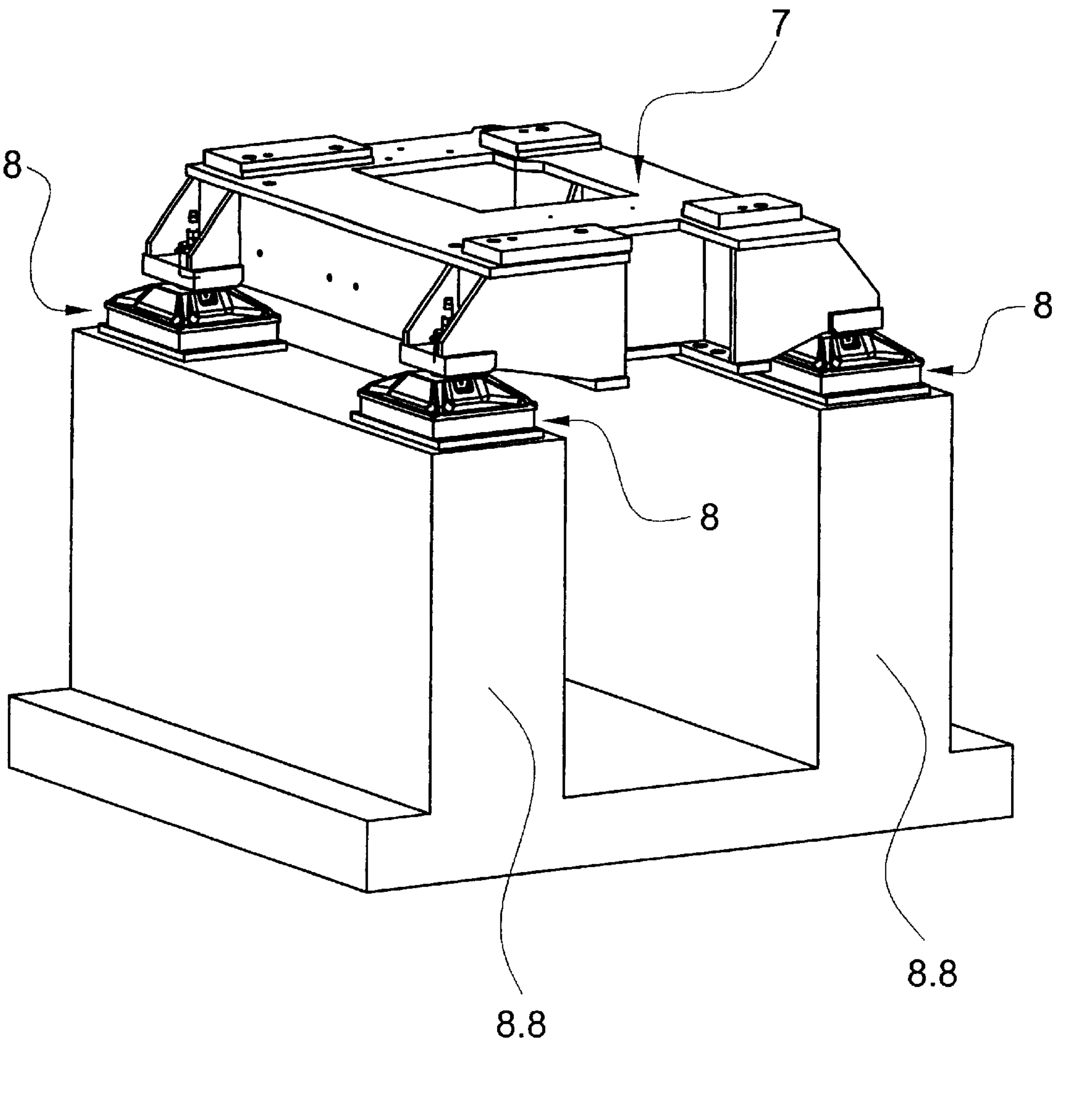
FIG. 2 is a view of a mount assembly carried by a foundation.
Figure 3:
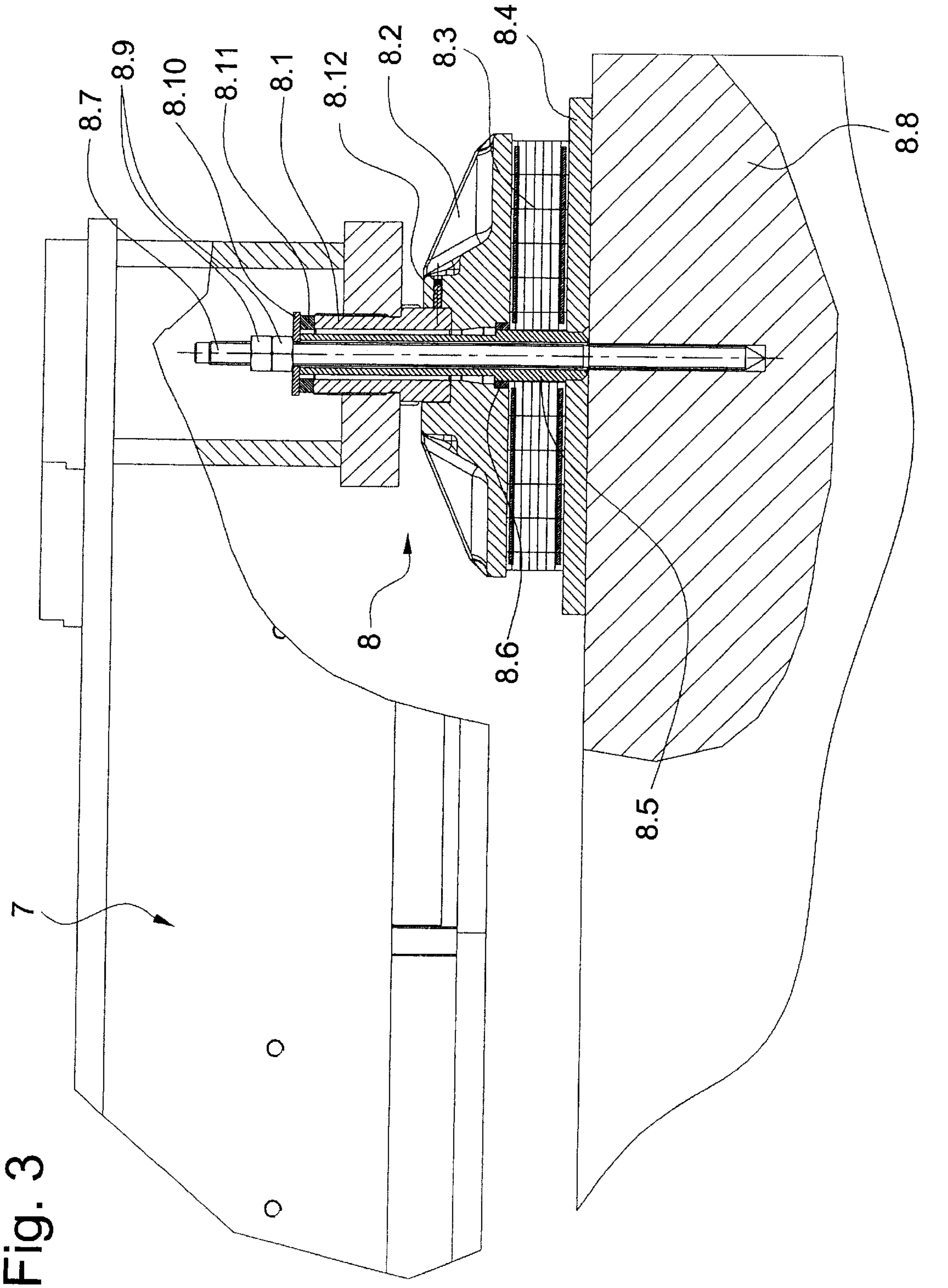
FIG. 3 is a section view detailing a mount.
Figure 4A:
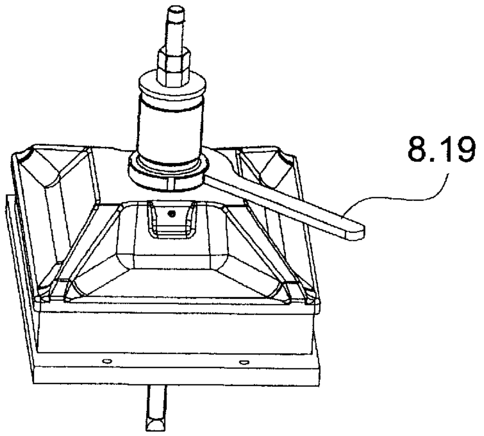
FIG. 4*a* is a view of an assembled mount.
Figure 4B:
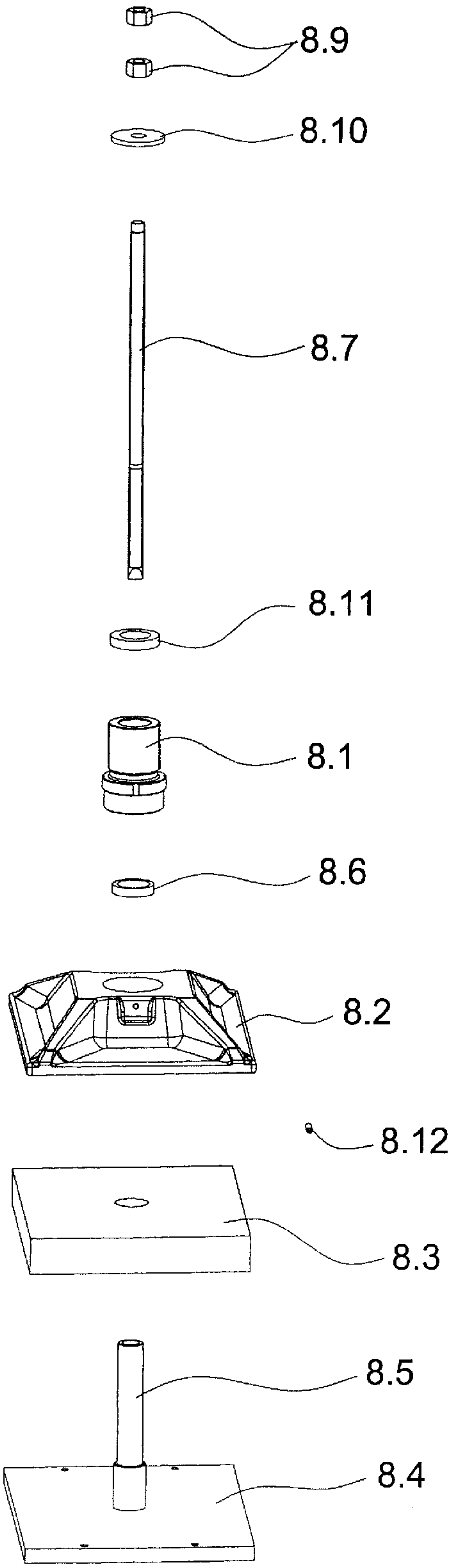
FIG. 4*b* is an exploded view of the mount.

The construction of the mount 8 is explained in more detail in FIGS. 3, 4*a* and 4*b*, wherein there are to be seen in FIG. 4*a* an assembled mount 8 and in FIG. 4*b* an exploded illustration of the mount 8. FIG. 3 shows details of the mount 8 and FIG. 2 the mount 8 is shown carried by a foundation.

The drive unit is supported on, for example, four identical mounts 8 which are adjustable in height and which conduct the forces of the drive unit to the foundation 8.8, fasten the drive unit in an earthquake-proof manner, and isolate it acoustically in terms of solid-borne sound from the foundation 8.8.

The drive unit can be adjusted in height by means of a shaft spanner tool 8.19 applied to threaded adjusting sleeve 8.1 screwed into and supporting the engine frame 7. The adjusting sleeve can be secured against unintended turning by a grub screw 8.12 screwed into a reception bore in the foot plate 8.2. The adjusting sleeve sits in a receiving bore in the foot plate 8.2. The foot plate transmits vertical forces of the drive unit and vertical earthquake forces from the adjusting sleeve 8.1 to the damping element 8.3, and horizontal earthquake forces from the adjusting sleeve 8.1 by way of a damping ring 8.6 to the tube 8.5 of the base plate 8.4. These horizontal forces are in turn transmitted by the tube 8.5 of the base plate 8.4 to the anchor bolt 8.7. In order to prevent lifting-off of the drive unit vertically upwardly, the mount 8 is secured to the anchor bolt and foundation 8.7 by nuts 8.9, washer 8.10 and rubber ring 8.11 on the anchor bolt. The anchor bolt 8.7 is in turn bonded into the foundation.

We claim:

1. The support apparatus wherein the anchor bolt extends upwardly through the tube which is located within the adjusting sleeve, the anchor bolt having means for retaining the adjusting sleeve whereby lifting-off of the drive unit is prevented.

2. The support apparatus of claim 1 wherein the retaining means comprise a nut and washer.

3. A lift drive unit support apparatus, comprising a plurality of mounts adapted to be positioned between a drive unit and a foundation, each mount comprising acoustic isolation means and means for transmitting vertical and horizontal forces to the foundation, at least one of the mounts further comprising a base plate; a damping element carried by the base plate; an adjusting sleeve for adjusting the operative height of the mount and leveling the drive unit having a first end connected to a frame of the drive unit and a second end connected to a foot plate constructed and adapted to transmit vertical forces to the damping element, the base plate having a tube coupled to the adjusting sleeve for receiving horizontal forces from the adjusting sleeve and an anchor bolt connected to the foundation.

4. The support apparatus of claim 3, wherein the adjusting sleeve has a threaded connection to connect to the frame.

5. The support apparatus of claim 4 the adjustment sleeve includes a tool reception portion for adjusting the operative height of the mount.

6. The support apparatus of claim 4 wherein the tool reception portion is adapted and dimensioned to accept a spanner tool.

7. The support apparatus of claim 3 further comprising means for maintaining the adjusting sleeve in a chosen position.

8. The support apparatus of claim 7 wherein the maintaining means comprise a grub screw located within a bore in the foot plate.

* * * * *